(12) United States Patent
Tanaka

(10) Patent No.: US 8,719,863 B2
(45) Date of Patent: May 6, 2014

(54) BROADCAST RECEIVING APPARATUS AND METHOD OF OUTPUTTING PROGRAM INFORMATION AS SPEECH IN BROADCAST RECEIVING APPARATUS

(75) Inventor: Shunsuke Tanaka, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/518,391

(22) PCT Filed: Nov. 11, 2010

(86) PCT No.: PCT/JP2010/006619
§ 371 (c)(1),
(2), (4) Date: Jun. 22, 2012

(87) PCT Pub. No.: WO2011/077627
PCT Pub. Date: Jun. 30, 2011

(65) Prior Publication Data
US 2012/0257111 A1  Oct. 11, 2012

(30) Foreign Application Priority Data

Dec. 25, 2009  (JP) ................................. 2009-294161

(51) Int. Cl.
*H04N 5/455*  (2006.01)
(52) U.S. Cl.
USPC ........................................................... 725/37

(58) Field of Classification Search
USPC .......................................... 725/37–40, 43–52
See application file for complete search history.

(56) References Cited

U.S. PATENT DOCUMENTS

2008/0155604 A1* 6/2008 Ku et al. .......................... 725/46

FOREIGN PATENT DOCUMENTS

| JP | 2000-324417 A | 11/2000 |
| JP | 2002-139244 A | 5/2002 |
| JP | 2003-264875 A | 9/2003 |
| JP | 2009-260685 A | 11/2009 |
| WO | WO-2009-118971 A1 | 10/2009 |

* cited by examiner

*Primary Examiner* — Jefferey Harold
*Assistant Examiner* — Samira Monshi
(74) *Attorney, Agent, or Firm* — Judge Patent Associates

(57) ABSTRACT

If a user requests an output of synthetic speech, a broadcast receiving apparatus (10), when a control section (105) determines on the basis of the display state of the broadcast receiving apparatus (10) that a synthetic speech signal is not to be output, outputs a confirmation sound generated by an operation confirmation sound generation section (108); and, when it is determined that the synthetic speech signal is to be output, outputs synthetic speech generated by a synthetic speech generation section (109), whereby it is possible to assist a user having difficulty viewing a screen, such as a visually-impaired person, with understanding the situation.

2 Claims, 8 Drawing Sheets

FIG. 4

TRANSITION FROM EACH STATE AND ITS FACTOR

| CURRENT STATE \ FACTOR | REMOTE CONTROL INPUT | LAPSE OF CERTAIN TIME |
|---|---|---|
| STATE A | TO STATE B | TO STATE B |
| | OUTPUT OPERATION CONFIRMATION SOUND | NO ADDITIONAL SOUND |
| STATE B | TO STATE C | TO STATE C |
| | OUTPUT OPERATION CONFIRMATION SOUND | NO ADDITIONAL SOUND |
| STATE C | TO STATE A | NO TRANSITION OF STATE |
| | OUTPUT SYNTHETIC SPEECH | NO ADDITIONAL SOUND |

FIG. 5

| TIME OF PROGRAM | TITLE OF PROGRAM | CHANNEL NAME |

FIG. 6

EIT (Event Information Table)

```
event_information_section(){
  table_id
  section_syntax_indicator
  reserved_future_use
  reserved
  section_length
  service_id
  reserved
  version_number
  current_next_indicator
  section_number
  last_section_number
  transport_stream_id
  original_network_id
  segment_last_section_number
  last_table_id
  for (i = 0;i< N;i++) {
    event_id
    start_time         ←——— START TIME OF PROGRAM
    duration           ←——— DURATION TIME OF PROGRAM
    running_status
    free_CA_mode
    descriptors_loop_length
    for (j = 0;j< M;j++) {
      descriptor()
    }
  }
  CRC_32
}
```

EVENT LOOP encompasses the for (i = 0;i< N;i++) block.

FIG. 7 short_event_descriptor

```
short_event_descriptor () {
  descriptor_tag
  descriptor_length
  ISO_639_language_code
  event_name_length
  for (i = 0;i< event_name_length;i++) {
    event_name_char
  }
  text_length
  for (i = 0;i< text_length;i++) {
    char
  }
}
```

FIG. 8

SDT(Sevice Description Table)

```
service_description_section(){
  table_id
  section_syntax_indicator
  reserved_future_use
  reserved
  section_length
  transport_stream_id
  reserved
  version_number
  current_next_indicator
  section_number
  last_section_number
  original_network_id
  reserved_future_use
  for (i = 0;i< N;i++) {                  ⎫
    service_id 16 uimsbf                  |
    reserved_future_use                   |
    H-EIT_flag                            |
    M-EIT_flag                            |
    L-EIT_flag                            |
    EIT_schedule_flag                     ⎬ SERVICE LOOP
    EIT_present_following_flag            |
    running_status                        |
    free_CA_mode                          |
    descriptors_loop_length               |
    for (j = 0;j< M;j++) {                |
      descriptor()                        |
    }                                     ⎭
  }
  CRC_32
}
```

FIG. 9

Service Descriptor

```
service_descriptor () {
  descriptor_tag
  descriptor_length
  service_type
  service_provider_name_length
  for (i = 0;i< N;i++) {
    char
  }
  service_name_length
  for (i = 0;i< N;i++) {
    service_char  ←——————  CHANNEL NAME
  }
}
```

BROADCAST RECEIVING APPARATUS AND METHOD OF OUTPUTTING PROGRAM INFORMATION AS SPEECH IN BROADCAST RECEIVING APPARATUS

TECHNICAL FIELD

The present invention relates to a broadcast receiving apparatus, and in particular, relates to a broadcast receiving apparatus having a speech synthesis function and a speech output function, and to a method of outputting program information as speech in a broadcast receiving apparatus.

BACKGROUND ART

A broadcast receiving apparatus receives television broadcasting where program information and the like are encoded in a digital television broadcast signal for multiplexing. The broadcast receiving apparatus has the function of presenting the encoded program information and the like to a user. Examples of a specific method of presenting the program information to the user include: a method of, when the user has requested the presentation of the program information, displaying the title of the program, the content of the program, and the like as character information using an OSD (on-screen display) function; and a method of, when the user has requested the presentation of the program information, converting the program information into a speech signal using a speech synthesis circuit for output (see Patent Literature 1, for example).

CITATION LIST

Patent Literature

[PTL 1] Japanese Laid-Open Patent Publication No. 2000-324417

SUMMARY OF THE INVENTION

Problems to be Solved by the Invention

Incidentally, a broadcast receiving apparatus having a speech synthesis function and a speech output function may convert character information presented to a user into a speech signal, and present the speech signal to the user as in the conventional technique described above; and present character information and speech information simultaneously. For example, a program banner as shown in FIG. 5 is displayed on a display screen by pressing a "screen display" button or the like on a remote control. In this case, the start time, the title, the channel name, and the like of the program are displayed as the program banner, simultaneously when their character information is converted into a speech signal for output.

Here, possible examples of the operation of the function of displaying the program banner by pressing the "screen display" button may include the operation of, as shown in FIG. 2, making transitions of the program banner to several states by pressing the "screen display" button. That is, this is the operation of making a transition to a state A if the "screen display" button is pressed in a state C; making a transition to a state B if the "screen display" button is pressed in the state A; and making a transition to the state C if the "screen display" button is pressed in the state B, so as to display the program banner based on the corresponding state. Meanwhile, there is also the operation of automatically making a transition of the display state of the program banner after the lapse of a certain time. The operation is performed as follows. For example, if a certain time has elapsed with no remote control input or the like provided since the program banner has made a transition to the state A, the program banner automatically makes a transition to the state B. If a certain time has elapsed with no remote control input or the like provided since the program banner has made a transition to the state B, the program banner automatically make a transition to the state C.

The case, however, is considered where, if character information and speech information are simultaneously presented as described above, a synthetic speech signal is output only when the state of the program banner is the state A. If the program banner in the state A is displayed when the user presses the "screen display" button to output a synthetic speech signal, the program banner makes a transition to the state B. If the program banner in the state B is displayed when the user presses the "screen display" button to output a synthetic speech signal, the program banner makes a transition to the state C and disappears. This results in the operation of outputting no synthetic speech signal.

Such an operation creates a situation where, for example, a user incapable of viewing the display screen cannot determine the reason why the pressing of the "screen display" button does not result in the output of a synthetic speech signal. That is, it is difficult to determine whether it is because transmission has not been correctly performed from a remote control button to the broadcast receiving apparatus, or because a synthetic speech signal is not output since the program banner is in the state B or the state C shown in FIG. 2.

It is an object of the present invention to provide a broadcast receiving apparatus capable of, if synthetic speech is not output on the basis of an operation by a user in a broadcast receiving apparatus having a speech synthesis function and a speech output function, presenting to the user the reason why the synthetic speech is not output, so that the user can understand the reason, and also provide a method of outputting program information as speech in a broadcast receiving apparatus.

Solution to the Problems

In a broadcast receiving apparatus according to the present invention, if an operation by a user on a remote control to request the output of synthetic speech has been received, a control section receives the request signal, determines, on the basis of the states of a broadcast image and an OSD image that are currently being displayed, whether a synthetic speech signal is to be output, or whether synthetic speech cannot be output as it is such that it is necessary to notify the user by alternative means.

If it is necessary to notify the user by alternative means, the output of a speech signal (e.g., a buzzer sound) different from a synthetic speech signal indicates to the user that synthetic speech cannot be output.

In addition, if it is necessary to notify the user by alternative means, a sentence stating that synthetic speech is not to be output is synthesized into a speech signal. Then, the speech signal is output instead of the content of the synthetic speech of which the output has been requested by the user.

Advantageous Effects of the Invention

The present invention makes it possible to, if synthetic speech is not output on the basis of an operation by a user, present to the user the reason why the synthetic speech is not output, so that the user can understand the reason.

BRIEF DESCRIPTION OF THE DRAWINGS

FIG. 4 is a diagram showing the correspondences among the presentation state of the program banner; and the transition of the presentation state and the content of speech or sound output after a remote control input and the lapse of a certain time.

FIG. 5 is a diagram showing the display content of the program banner.

FIG. 6 is a diagram showing the configuration of an event information table (EIT).

FIG. 7 is a diagram showing the configuration of "short_event_descriptor".

FIG. 8 is a diagram showing the configuration of a service description table (SDT).

FIG. 9 is a diagram showing the configuration of "Service Descriptor".

DESCRIPTION OF EMBODIMENTS

With reference to the drawings, an embodiment of the present invention is described in detail.

In the present embodiment, a description is given of an embodiment where a broadcast receiving apparatus is a digital broadcasting receiving apparatus that receives digital broadcasting from broadcast stations. The broadcast receiving apparatus according to the present invention, however, may be an analog broadcasting receiving apparatus that receives analog broadcasting, or may be a broadcast receiving apparatus capable of receiving both digital broadcasting and analog broadcasting.

Figure 1:
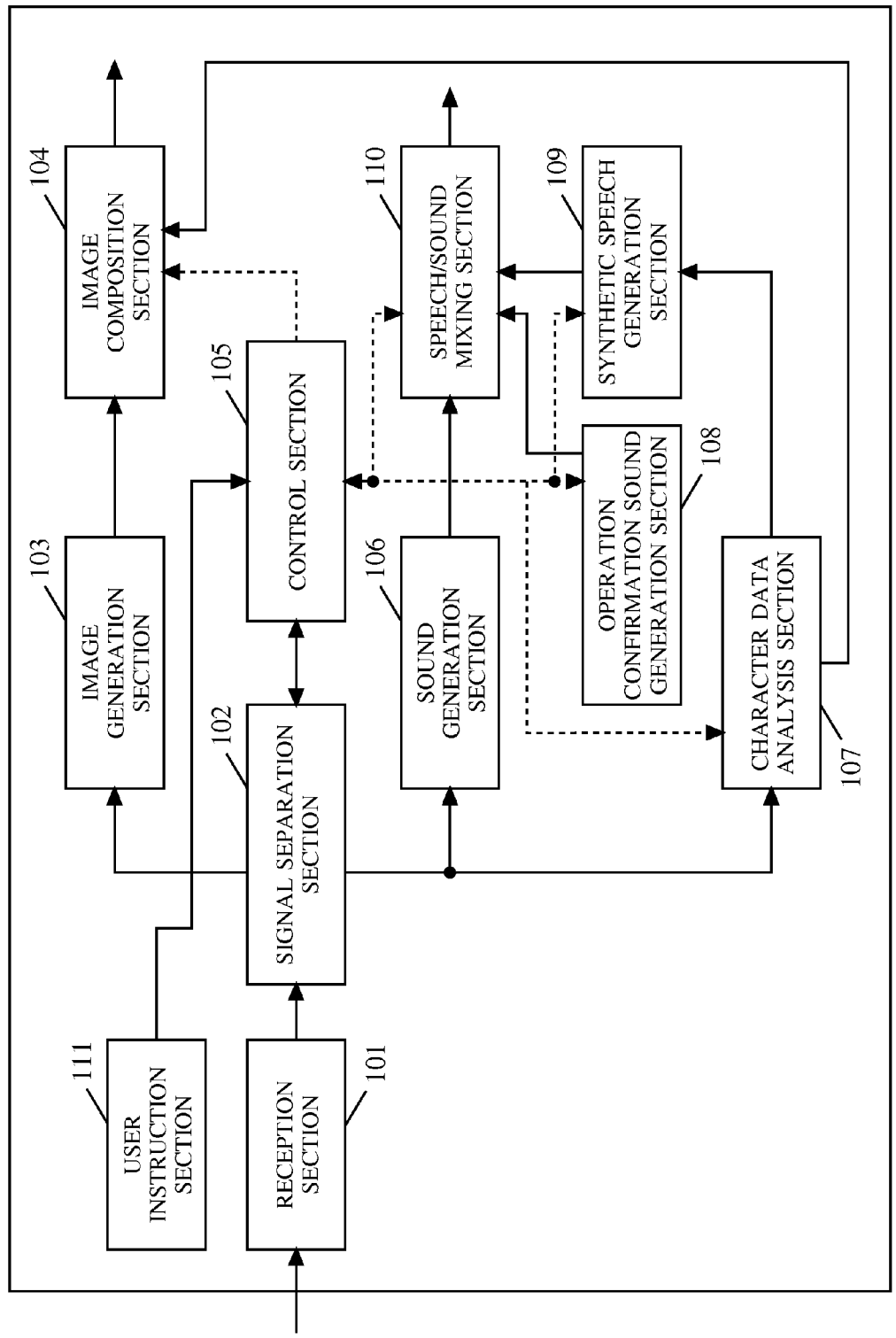
FIG. 1 is a block diagram showing the configuration of a broadcast receiving apparatus according to an embodiment of the present invention.

FIG. 1 is a block diagram showing the configuration of the broadcast receiving apparatus according to the embodiment of the present invention. As shown in FIG. 1, a broadcast receiving apparatus 10 includes a reception section 101, a signal separation section 102, an image generation section 103, an image composition section 104, a control section 105, a sound generation section 106, a character data analysis section 107, an operation confirmation sound generation section 108, a synthetic speech generation section 109, a speech/sound mixing section 110, and a user instruction section 111. The broadcast receiving apparatus 10 according to the present embodiment is different from a conventional broadcast receiving apparatus in that the broadcast receiving apparatus 10 includes the operation confirmation sound generation section 108 in order to output an operation confirmation sound if synthetic speech is not output.

The reception section 101 decodes a digital broadcasting signal received by an antenna (not shown), and outputs to the signal separation section 102 a transport stream, which is the decoded digital broadcasting signal. The signal separation section 102 separates from the received transport stream a sound stream including a PES packet of a sound signal, an image stream including a PES packet of an image signal, and program information data.

The separated sound stream is output to the sound generation section 106, and is converted into a sound signal. Then, the sound signal is output to the speech/sound mixing section 110. The separated image stream is output to the image generation section 103, and is converted into an image signal. Then, the image signal is output to the image composition section 104.

The image composition section 104 outputs the converted image signal as it is to an image output section (not shown); outputs to the image output section (not shown) the converted image signal having superimposed thereon an OSD signal of a program banner or the like or an OSD signal of program listings or the like; or performs switching to output only an OSD signal to the image output section (not shown). The process of switching these image signals to be displayed is performed in accordance with a switch signal from the control section 105.

Part of the program information data separated by the signal separation section 102 is output to the character data analysis section 107. The broadcast receiving apparatus 10 according to the present embodiment is capable of outputting a program banner 220 shown in FIG. 2 from the image composition section 104. Information to be displayed as the program banner 220 uses information transmitted in a table form termed an EIT (Event Information Table), which is part of the program information data separated by the signal separation section 102.

The start time of a program is calculated with reference to "start_time" in an event loop of an EIT shown in FIG. 6, and the end time of the program is calculated by adding a duration time to "start_time". The broadcast station name of the program is obtained as follows. The character string of "service_char" in "Service_Descriptor", which is a descriptor ("descriptor( )") in a service loop of an SDT (Service Description Table) shown in FIG. 8, is acquired for use as the broadcast station name. FIG. 9 shows "Service_Descriptor". The title information of the program is described in "event_name_char" in "short_event_descriptor" shown in FIG. 7. It should be noted that "short_event_descriptor" is a descriptor in the event loop of the EIT. The character data analysis section 107 extracts the program title information from "short_event_descriptor", and outputs the extracted character data to the image composition section 104 and the synthetic speech generation section 109. The image composition section 104 generates image signals of the program banner and the program listings using, for example, the character data received from the character data analysis section 107.

The synthetic speech generation section 109 receives the character data output from the character data analysis section 107, and generates a speech signal based on the character data signal. The generated speech signal is output as a synthetic speech signal to the speech/sound mixing section 110. Having received an instruction signal from the control section 105, the operation confirmation sound generation section 108 generates a sound signal of a buzzer sound or the like, and outputs the sound signal to the speech/sound mixing section 110.

The speech/sound mixing section 110 receives the sound signal converted by the sound generation section 106, the synthetic speech signal generated by the synthetic speech generation section 109, and the sound signal generated by the operation confirmation sound generation section 108. Then, the speech/sound mixing section 110 makes selection from among the sounds and the speech described above in accordance with a control signal from the control section 105, and outputs to a speech/sound output section (not shown) any single one of the sounds and the speech described above or a mixture of a plurality of signals among the sound signals and the speech signal.

The control section 105 receives a remote control signal from the user instruction section 111, and outputs an instruction signal to the image composition section 104, the synthetic speech generation section 109, the operation confirmation sound generation section 108, or the speech/sound mixing section 110 in accordance with the received remote control signal. Further, the control section 105 stores the current display state (a state A, a state B, or a state C) of the program banner. A speech/sound output control process of the control section 105 will be described in detail later with reference to FIGS. 3 and 4.

It should be noted that in the present embodiment, the image output section (not shown) and the speech/sound output section (not shown) are components of the broadcast receiving apparatus 10, but may be separated from the broadcast receiving apparatus 10.

Figure 2:
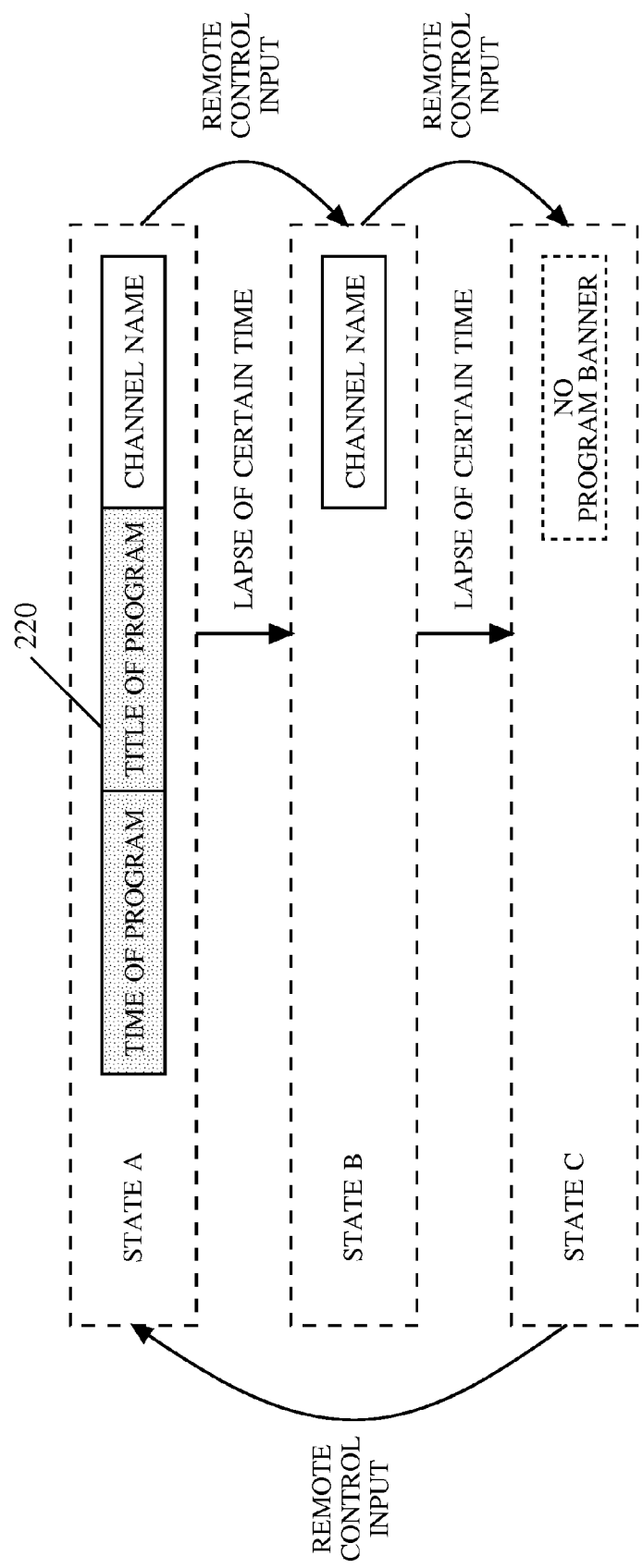
FIG. 2 is a diagram showing the presentation state of a program banner and the transition of the presentation state after a remote control input and the lapse of a certain time.

With reference to FIG. 2, a specific description is given of the state of the broadcast receiving apparatus 10 according to the present embodiment and the display content of the program banner. In the state A, the time of the program, the title of the program, and the channel name are displayed as the program banner 220. In the state B, only the channel name is displayed as the program banner. In the state C, the program banner is not displayed.

If a "screen display" button, for example, is pressed on a remote control when the broadcast receiving apparatus 10 is in the state A, the state A makes a transition to the state B such that the program banner changes to represent only the channel name. If the "screen display" button is pressed on the remote control when the broadcast receiving apparatus 10 is in the state B, the state B makes a transition to the state C such that the program banner is deleted. If the "screen display" button is pressed on the remote control when the broadcast receiving apparatus 10 is in the state C, the state C makes a transition to the state A such that the time of the program, the title of the program, and the channel name are displayed as the program banner 220. As such, the program banner is displayed such that the amount of information of the program banner changes stepwise in response to an instruction from the remote control. That is, the amount of information of the program banner is largest in the state A, and decreases stepwise in the order of the state B and the state C.

In addition, if a predetermined time has elapsed with no remote control input provided from the user instruction section 111 when the broadcast receiving apparatus 10 is in the state A, the state A makes a transition to the state B such that the program banner changes to represent only the channel name. If a predetermined time has elapsed with no remote control input provided from the user instruction section 111 when the broadcast receiving apparatus 10 is in the state B, the state B makes a transition to the state C such that the program banner is deleted. It should be noted that if a predetermined time has elapsed with no remote control input provided from the user instruction section 111 when the broadcast receiving apparatus 10 is in the state C, the state C does not make a transition, and thus, the program banner remains hidden.

Meanwhile, the output of synthetic speech is as follows. Only when a transition is made to the state A, character information of the time of the program, the title of the program, and the channel name is synthesized into speech for output. When a transition is made to the state B or the state C, no synthetic speech signal is output.

Figure 3:
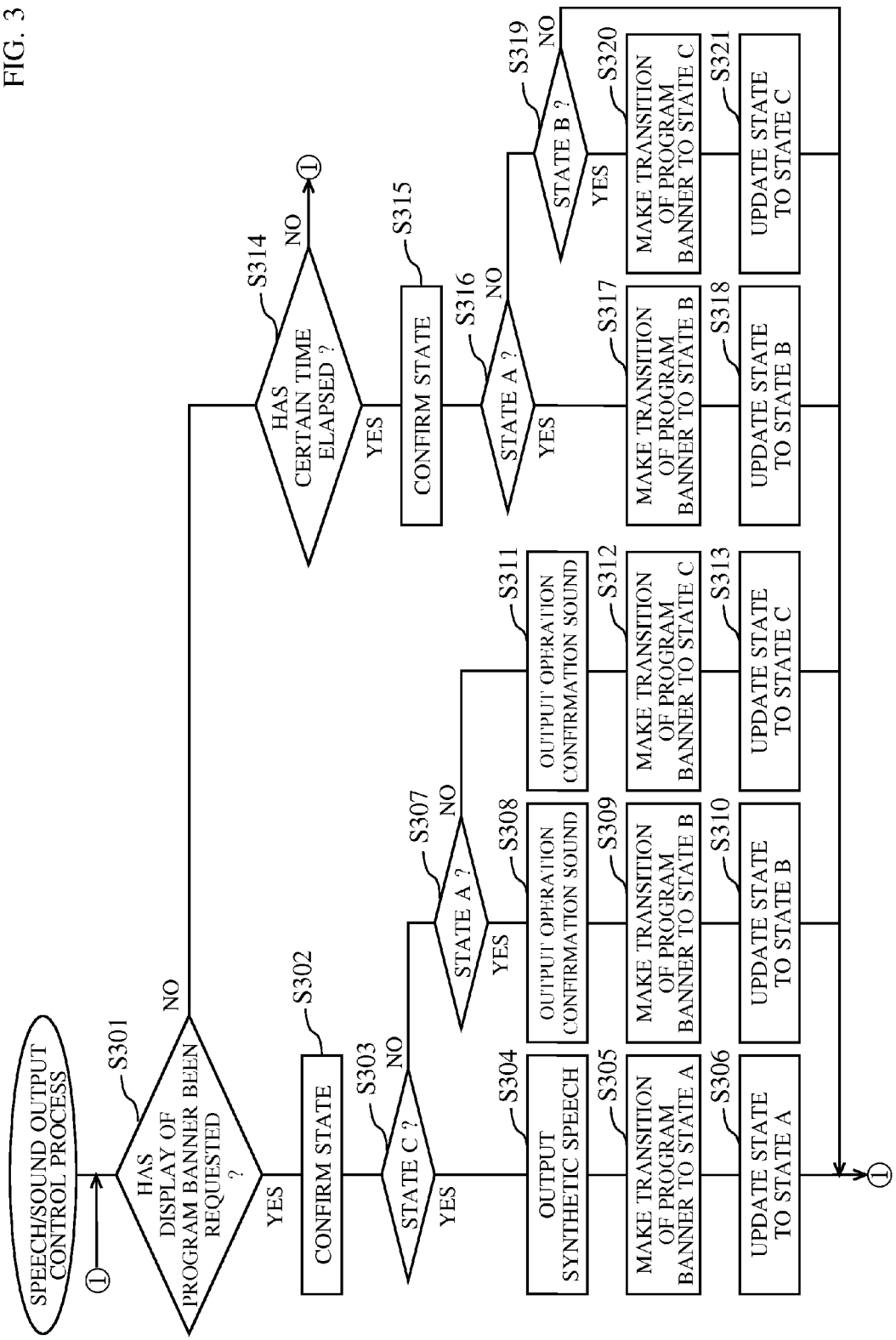
FIG. 3 is a flow chart showing a speech/sound output control process according to the embodiment of the present invention.

Here, with reference to a flow chart of FIG. 3, the speech/sound output control process of the control section 105 is described. It should be noted that FIG. 4 shows the speech/sound output control process of the control section 105 in FIG. 3 by associating the transition of the state of the program banner with the state of sound output when a trigger is input, the vertical axis corresponding to the current display state (current state) of the program banner, and the horizontal axis corresponding to a trigger (factor) for making a transition of the program banner.

If receiving, from the user instruction section 111, information indicating that the "screen display" button has been pressed (step S301), the control section 105 confirms the stored current display state of the program banner (step S302).

If the current display state of the program banner is the "state C" ("YES" in step S303), the control section 105 controls the character data analysis section 107, the synthetic speech generation section 109, and the speech/sound mixing section 110 to output a synthetic speech signal (step S304). After the synthetic speech signal is output, the control section 105 controls the character data analysis section 107 and the image composition section 104 to make a transition of the program banner from the state C to the state A, and also updates the current display state of the program banner to the "state A" (steps S305 and S306). It should be noted that step S304 may be performed after step S305 or S306.

If the current display state of the program banner is the "state A" ("NO" in step S303 and "YES" in step S307), the control section 105 controls the operation confirmation sound generation section 108 and the speech/sound mixing section 110 to output an operation confirmation sound (step S308). After the operation confirmation sound is output, the control section 105 controls the character data analysis section 107 and the image composition section 104 to make a transition of the program banner from the state A to the state B, and also updates the current display state of the program banner to the "state B" (steps S309 and S310).

If the current display state of the program banner is the "state B" ("NO" in step S303 and "NO" in step S307), the control section 105 controls the operation confirmation sound generation section 108 and the speech/sound mixing section 110 to output an operation confirmation sound (step S311). After the operation confirmation sound is output, the control section 105 controls the character data analysis section 107 and the image composition section 104 to make a transition of the program banner from the state B to the state C, and also updates the current display state of the program banner to the "state C" (steps S312 and S313).

On the other hand, if a certain time has elapsed since the control section 105 has not received, from the user instruction section 111, information indicating that the "screen display" button has been pressed ("NO" in step S301 and "YES" in step S314), the control section 105 confirms the current display state of the program banner (step S315). If the current display state of the program banner is the "state A" ("YES" in step S316), the control section 105 controls the character data analysis section 107 and the image composition section 104 to make a transition of the program banner from the state A to the state B without outputting a synthetic speech signal or an operation confirmation sound, and also updates the current display state of the program banner to the "state B" (steps S317 and S318).

If the current display state of the program banner is the "state B" ("NO" in step S316 and "YES" in step S319), the control section 105 controls the character data analysis section 107 and the image composition section 104 to make a transition of the program banner from the state B to the state C without outputting a synthetic speech signal or an operation confirmation sound, and also updates the current display state of the program banner to the "state C" (steps S320 and S321).

If the current display state of the program banner is the "state C" ("NO" in step S316 and "NO" in step S319), neither a synthetic speech signal nor an operation confirmation sound are output, and the current display state of the program banner does not make a transition either.

Based on the present embodiment, if information related to the program banner is output as a sound or speech in accordance with the transition of the program banner, synthetic speech is not output when the state A makes a transition to the state B or the state B makes a transition to the state C on the basis of a remote control input; however, an operation confirmation sound generated by the operation confirmation sound generation section 108 is output. This enables a visually-impaired user to, when pressing a remote control button to listen to synthetic speech, understand the reason why the synthetic speech is not output.

It should be noted that in the present embodiment, the operation confirmation sound generation section 108 generates an operation confirmation sound, and outputs the sound. Alternatively, an operation confirmation sound storage section (not shown) may be provided instead of the operation confirmation sound generation section 108. In this case, the operation confirmation sound storage section (not shown) stores in advance, in a storage device implemented with a hard disk or a memory, an operation confirmation sound or a sentence stating that synthetic speech is not to be output. Then, if the operation confirmation sound needs to be output, the operation confirmation sound storage section reads a sound signal stored in the storage device, and outputs the sound signal to the speech/sound mixing section 110.

Figure 10:
FIG. 10 is a diagram illustrating a speech/sound output control process performed on program listings according to the embodiment of the present invention.

It should be noted that the present embodiment is described taking a program banner as an example. Also in the case of program listings, however, if a synthetic speech signal of which the presentation has been requested by the user is not output, the output of a confirmation sound makes it possible to assist the user with understanding the situation. FIG. 10 is television program listings where the user can select each program using a cursor. For example, FIG. 10 shows the state where the cursor is located on the program A. If the user presses a down cursor button in this state, the cursor moves to the program B. Having determined that the cursor is located on the program B, the control section 105 causes the synthetic speech generation section 109 to generate a speech signal based on the start time, the channel name, and the title information of the program B, and output the speech signal to the speech/sound mixing section 110. The start time, the channel name, and the title information of the program can be acquired from the EIT and the SDT in a similar manner to the program banner shown in FIG. 5.

Here, if the cursor is located on the program A, the program currently being broadcast is the program A, and the pressing of an up cursor key does not cause the program above the program A to be displayed in the program listings because it is a past program, the cursor does not move from the program A. In this case, the pressing of the up cursor key does not lead to the generation of synthetic speech representing the start time, the channel name, and the title of the program. In such a case, the user having difficulty viewing the screen cannot understand why the pressing of the up cursor key does not result in the output of the start time, the channel name, and the program title of the program. In such a case, a sound signal generated by the operation confirmation sound generation section 108 is output in a similar manner to the program banner.

It should be noted that an operation confirmation sound may be output also between steps S303 and S304 of FIG. 3. The operation confirmation sound output in this case is a particular operation confirmation sound different from the operation confirmation sounds output in steps S308 and S311. This results in the output of a particular operation confirmation sound before information of the program banner is output as synthetic speech. This enables the user having difficulty viewing the screen to understand that the information of the program banner will be output as speech, and acquire the information of the program banner by concentrating on listening to the synthetic speech.

As described above, the broadcast receiving apparatus according to the present embodiment enables a visually-impaired user to easily understand the state of screen transition, and easily understand the reason why the screen does not make a transition. The output of synthetic speech in such a state enables the visually-impaired user to certainly acquire information of a program banner. Further, the synchronization between the display state of the program banner and the output state of the synthetic speech or an operation confirmation sound enables a visually-impaired person and an able-bodied person (or a hearing-impaired person) to share the same information even when they are viewing the same broadcast receiving apparatus.

INDUSTRIAL APPLICABILITY

The broadcast receiving apparatus according to the present invention makes it possible that if a user has requested the presentation of synthetic speech but the synthetic speech signal is not output, the output of a confirmation sound assists the user having difficulty viewing a screen with understanding the situation, and the broadcast receiving apparatus is applied to AV equipment having a speech synthesis function.

DESCRIPTION OF THE REFERENCE CHARACTERS 101 reception section
102 signal separation section
103 image generation section
104 image composition section
105 control section
106 sound generation section
107 character data analysis section
108 operation confirmation sound generation section
109 synthetic speech generation section
110 speech/sound mixing section
111 user instruction section

The invention claimed is:

1. A broadcast receiving apparatus comprising:
a reception section configured to receive a broadcast signal;
an analysis section configured to analyze program information included in the received broadcast signal;
an image composition section configured to generate from the analyzed program information a first program banner that has information including a time, a title, and a channel name, and a second program banner that has some or none of said information for output;
a synthetic speech generation section configured to generate a synthetic speech signal from the analyzed program information;

an operation confirmation sound generation section configured to generate an operation confirmation sound;

a speech/sound mixing section configured to output either the generated synthetic speech signal or the generated operation confirmation sound; and a control section configured to control the image composition section, the synthetic speech generation section, and the speech/sound mixing section; wherein the control section:

causes the image composition section to generate either the first program banner or the second program banner with every time the control section receives an instruction to display a program banner;

determines, in accordance with an output state of the program banner when receiving said instruction, whether or not the synthetic speech signal is to be output;

if having determined that the synthetic speech signal is to be output, causes the speech/sound mixing section to output the synthetic speech signal generated by the synthetic speech generation section;

if having determined that the synthetic speech signal is not to be output, causes the speech/sound mixing section to output the operation confirmation sound generated by the operation confirmation sound generation section;

if the program banner when the instruction is received is the second program banner, causes the speech/sound mixing section to output a synthetic speech signal corresponding to the information of the first program banner generated by the synthetic speech generation section, and output the first program banner to the image composition section; and if the program banner when the instruction is received is the first program banner, causes the speech/sound mixing section to output the operation confirmation sound generated by the operation confirmation sound generation section, and output the second program banner to the image composition section.

2. A method of outputting program information as speech in a broadcast receiving apparatus, the method comprising the steps of:

receiving an instruction to display a program banner;

generating either a first program banner that has information including a time, a title, and a channel name, or a second program banner that has some or none of said information with every time said instruction is received;

determining, every time said instruction is received, and in accordance with a current output state of the program banner, whether or not information of the program banner is to be output as a synthetic speech signal;

outputting an operation confirmation sound if it is determined that the information of the banner is not to be output as a synthetic speech signal;

outputting a synthetic speech signal corresponding to the information of the first program banner and outputting the first program banner, if the program banner when the instruction is received is the second program banner; and outputting the operation confirmation sound and outputting the second program banner, if the program banner when the instruction is received is the first program banner.

* * * * *